(No Model.)
C. C. STOVER.
APPARATUS FOR OPERATING OIL WELL PUMPS.
No. 383,025. Patented May 15, 1888.
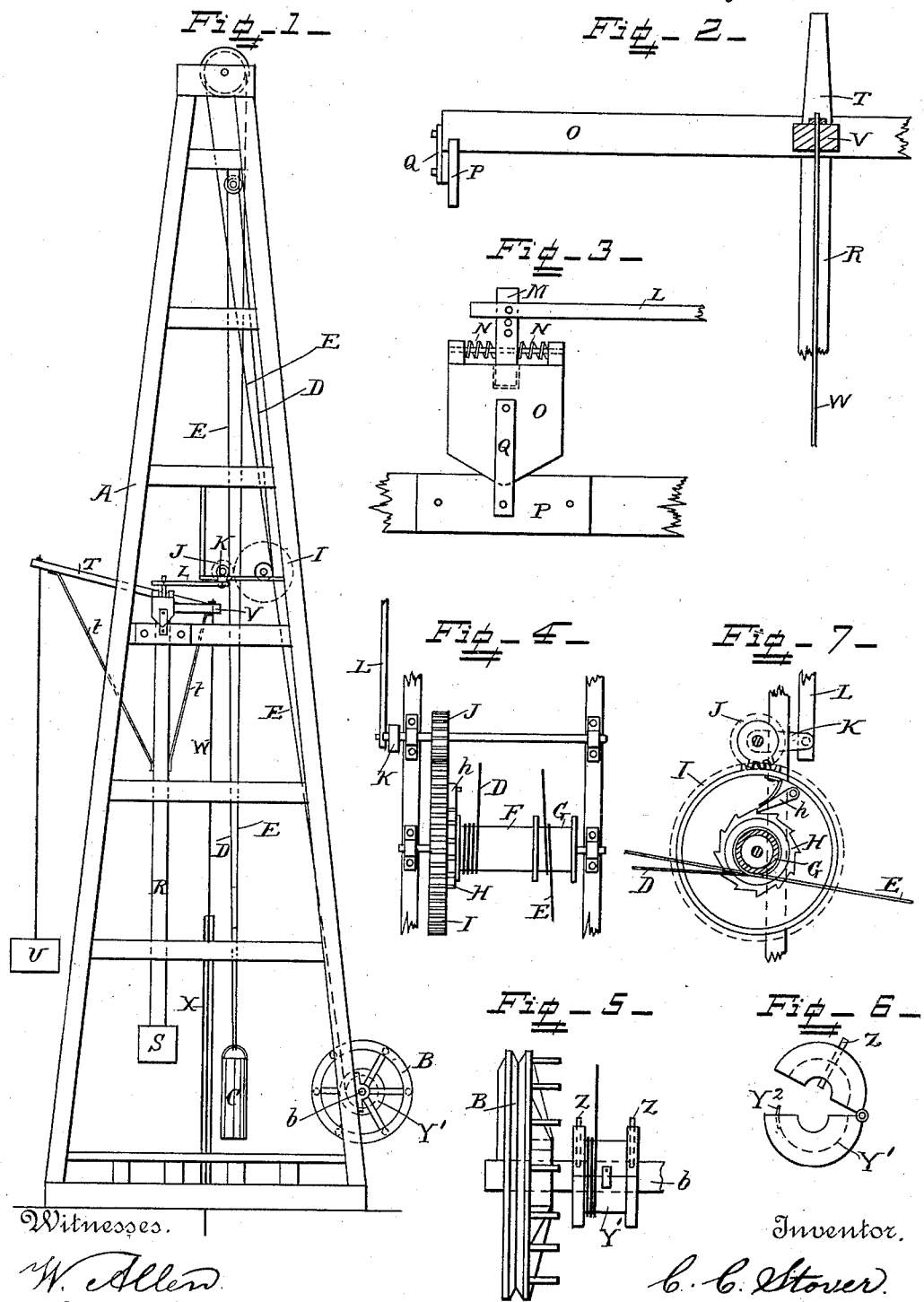
Witnesses.
W. Allen
F. A. Kerly
Inventor,
C. C. Stover
By his Attorney
Herbert W. T. Jenner.

UNITED STATES PATENT OFFICE.

COCHRAN C. STOVER, OF BRADFORD, PENNSYLVANIA.

APPARATUS FOR OPERATING OIL-WELL PUMPS.

SPECIFICATION forming part of Letters Patent No. 383,025, dated May 15, 1888.

Application filed April 12, 1886. Renewed March 31, 1888. Serial No. 269,105. (No model.)

*To all whom it may concern:*

Be it known that I, COCHRAN C. STOVER, a citizen of the United States, residing at Bradford, in the county of McKean and State of Pennsylvania, have invented certain new and useful Improvements in Apparatus for Operating the Pumps of Oil-Wells; and I do hereby declare the following to be a full, clear, and exact description of the invention, such as will enable others skilled in the art to which it appertains to make and use the same.

The object of my invention is to provide a means for pumping small oil-wells which would not justify the expense of keeping an engine and boiler, and which do not require to be pumped for any long period of time at once. There are many oil-wells that can be pumped off in a few minutes each day, and by balancing the weight of the sucker-rods and providing a weight of sufficient power to actuate the small pumping machinery which I have devised I have made a device which will be valuable in many parts of the oil region.

In the drawings, Figure 1 represents a derrick with my improved pumping device attached thereto. Fig. 2 is a side view of the main rocking shaft. Fig. 3 is an end view of the rocking shaft, showing the pitman attached to it. Fig. 4 is a top view of the windlass upon which the rope which suspends the weight is coiled. Fig. 5 is a side view of one end of the bull-wheel. Fig. 6 is an end view of a movable spool to be attached to the bull-wheel. Fig. 7 is a detail side view of the ratchet connecting the windlass barrel with the gear-wheel.

A represents the derrick, and B is the bull-wheel. Upon the bull-wheel shaft $b$ is affixed the movable spool Y'. This spool is made in two parts hinged together, so that it can be clasped around the bull-wheel shaft $b$, and when closed the two parts are held by the catch Y². A small hole is bored through the one part of the spool and into the bull-wheel shaft $b$, and the pin Z is inserted therein, so as to cause the spool Y' to revolve with the bull-wheel, and when the pin Z is drawn out the spool Y' will revolve freely upon the bull-wheel shaft $b$. The actuating-power of the pumping apparatus is the weight C, which is suspended by the two ropes D and E, which pass over pulleys at the top of the derrick, and one rope, E, is coiled upon the barrel F of the windlass. The windlass has two barrels, F and G, cast solid or otherwise connected, so that both revolve together. The rope D is coiled once around the barrel G of the windlass and carried down and fastened to the spool Y'. When the bull-wheel B is turned in the proper direction, the spool Y' being fastened to the shaft, the rope D is coiled upon the spool Y', and the weight C is drawn up to the top of the derrick, or as far as may be necessary. The coiling up of the rope D on the spool Y' necessarily causes the barrels F and G to rotate and the rope D is coiled upon the barrel F of the windlass.

A ratchet-wheel, H, is secured to the barrel F, and $h$ is a pawl which is pivoted to the spur-wheel I, and which engages with the ratchet wheel, so that the barrel may be revolved in one direction without turning the spur-wheel. The spur-wheel I is mounted upon the same shaft as the barrels and meshes into the spur-wheel J, the latter being provided with a crank, K, and this is connected by the pitman L, through the medium of the lever M, with the rocking beam O. The rocking beam O has projecting from its center the oscillating beam V, which is connected to the sucker-rod W, the end of the beam V being directly over the tubing X. The rocking beam O is supported at each side of the derrick by a plate, P, in a groove in which its beveled edge works. The rocking beam O is united to the plate P by the tie Q, which allows the free oscillation of the beam O.

In order to prevent any jar during the oscillation of the beam, the spiral springs N N are introduced on each side of the bar M, so that the motion of that bar shall be smooth and uniform.

T is a beam projecting from the rocking beam O, on the end of which is suspended a counterpoise, U. This counterpoise must be made of a weight sufficient to exactly balance the weight of the sucker-rod W, so that as little power as possible shall be needed to actuate them.

R is a pendulum-rod having a heavy pendulum, S, at its lower end. This pendulum is suspended from the rocking beam O and firmly mortised and keyed thereto, or otherwise connected to it in any convenient manner, so that the oscillation of the pendulum S will rock the beam O backward and forward. The pendulum R is further secured to the beams T and V by the braces $t\ t$.

The apparatus being wound up by rotation of the bull-wheel, as above described, the pin Z is withdrawn from the spool Y', so as to leave the said spool free to slip upon the bull-wheel shaft $b$. The pendulum S is then swung to and fro, and the rocking motion of the beam L causes the rotation of the crank K and the spur-wheel J, and through the medium of the wheel I allows the rotation of the windlass F and G, and also causes an alternate raising and lowering of the beam V and of the sucker-rod W, thus pumping the well. The motion of the pendulum would soon stop were it not that the gravity of the weight C, pulling, through the medium of the rope E, upon the windlass, aids in the rotation of the crank K, and gives sufficient power to keep up the motion of the rocking beam and of the pendulum, being in this respect similar to the action of the weight upon the pendulum of a clock.

The weight C for ordinary wells twelve hundred feet deep should be about five hundred pounds, the pendulum S should be about fifty pounds, and the counterpoise U should be weighed so as to balance as nearly as possible the weight of the sucker-rods.

What I claim as new, and desire to secure by Letters Patent, is—

1. In a pumping-rig, the combination of a supporting-frame, a rocking beam pivoted in the frame and provided with a counter-balance to the weight of the pump-rod, a vibrating pendulum secured to the said beam, a heavy descending weight and intermediate winding-gear for keeping up the vibrations of the pendulum, and a spring-connection interposed between the said gear and the rocking beam, substantially as and for the purpose set forth.

2. In a pumping-rig, the combination of a supporting-frame, a rocking beam pivoted in the frame, a vibrating pendulum secured to the beam, a descending weight provided with a cord, a revolving barrel for the cord, intermediate winding gear provided with a ratchet and pawl and connecting the barrel with the rocking beam, and a revoluble bull-wheel connected to one end of the said cord for winding the other end of the cord upon the barrel, substantially as and for the purpose set forth.

3. In a pumping-rig, the combination of a supporting-frame, a rocking beam pivoted in the frame, a vibrating pendulum secured to the beam, a descending weight provided with a cord, the barrels F and G, having the ends of the said cord wound around them, as set forth, intermediate winding-gear provided with a ratchet and pawl and connecting the barrels with the rocking beam, the bull-wheel mounted upon a revoluble shaft, a sleeve having the end of the cord passing around barrel G secured to it, and a retractible pin for connecting the sleeve to the shaft, substantially as and for the purpose set forth.

COCHRAN C. STOVER.

Witnesses:
JAMES C. BOYCE,
LILLIAN E. HOFFMAN.